Patented Mar. 6, 1928.

1,661,169

UNITED STATES PATENT OFFICE.

HENRY DREYFUS, OF LONDON, ENGLAND.

MANUFACTURE OF COMPOSITIONS OR PREPARATIONS WITH CELLULOSE DERIVATIVES.

No Drawing. Application filed May 26, 1923, Serial No. 641,761, and in Great Britain July 13, 1922.

This invention relates to the manufacture of celluloid-like materials, photographic or other films or sheets, dopes, varnishes or other compositions, solutions or preparations (all hereinafter included in the term composition of matter) made with methyl cellulose, ethyl cellulose, benzyl cellulose or other ethers of cellulose, associated with plasticising agents.

Various substances have been proposed as plasticising agents for cellulose ethers for the manufacture of compositions, preparations or solutions such as referred to.

It has now been found that the substance known as chloretone or trichlorotertiary butyl alcohol (1.1.1.trichloro.2.methyl- propanol 2), which can be readily obtained by condensation of acetone and chloroform, is a good solvent and plasticiser for methyl cellulose, ethyl cellulose, benzyl cellulose and other celluose ethers. This substance has a high boiling point (about 167° C.) and a high vapour tension at ordinary temperature; it is insoluble, or but very little soluble in water and has a melting point about 96°–97° C. It is soluble in numerous organic solvents, e. g. acetone, ethyl acetate, alcohol and chloroform. With its aid plastic, celluloid-like materials can be made which are elastic and tough and closely approach in desirable properties to nitrocellulose celluloid. This plasticiser is also practically non-inflammable, which is a further advantage for the manufacture of celluloid-like materials, films, or other compositions or preparations of low inflammability. Other substances or ingredients may be mixed or incorporated with the cellulose ether and the chloretone, as for example other solvents or non-solvents (non-volatile or volatile) of the cellulose ether or ethers used, bodies for imparting suppleness to the product, such as castor oil or other vegetable oils, substances for rendering the product still less inflammable, such as triphenyl phosphate, tricresylphosphate and so forth, filling materials colouring matters, or any other usual or suitable additions according to the character of the product to be made.

*Example 1.*

70 parts of ethyl or benzyl cellulose and about 30 parts of chloretone are kneaded together in the usual way for making celluloid.

*Example 2.*

70 parts of ethyl or benzyl cellulose are dissolved in a mixture of about 7 parts of chloretone and about 350–650 parts of acetone to form a solution which may be used as a varnish, or for running to form a film.

Larger or smaller proportions of the chloretone may be employed. Also other plasticisers, filling materials, volatile or nonvolatile solvents or liquids, softening or suppling agents, substances for reducing inflammability, filling materials, colouring matters and so forth (all hereinafter in the claims included in the term added material) may be added according to the character of product desired or other circumstances. Also it is of course understood that mixtures of or containing more than one cellulose ether may be used.

It is understood that the chloretone may be employed, with cellulose ethers in the manufacture of films or sheets, or in dope or varnish solution, in order to improve the quality of the film or coating left after evaporation of the volatile solvents or liquids usually employed therein, and that it may be employed generally in the manufacture of plastic masses, compositions, films, solutions or preparations made with cellulose ethers.

What I claim and desire to secure by Letters Patent is:—

1. A composition of matter comprising a cellulose ether and trichloro tertiary butyl alcohol.

2. A composition of matter comprising a cellulose ether, trichloro tertiary butyl alcohol and other plasticisers.

3. A composition of matter comprising a cellulose ether, trichloro tertiary butyl alcohol, other plasticisers and substances for reducing inflammability of the mixture.

4. A composition of matter comprising a cellulose ether, trichloro tertiary butyl alcohol, other plasticisers, substances for reducing inflammability of the mixture and added solvents.

5. A composition of matter comprising a cellulose ether, trichloro tertiary butyl alcohol and a liquid solvent of the cellulose ether.

6. A composition of matter comprising ethyl cellulose and trichloro tertiary butyl alcohol.

7. A composition of matter comprising ethyl cellulose, trichloro tertiary butyl alcohol and other plasticisers.

8. A composition of matter comprising ethyl cellulose, trichloro tertiary butyl alcohol, other plasticisers and substances for reducing inflammability of the mixture.

9. A composition of matter comprising ethyl cellulose, trichloro tertiary butyl alcohol and a liquid solvent of the ethyl cellulose.

10. A composition of matter comprising about 70 parts of ethyl cellulose and about 30 parts of trichloro tertiary butyl alcohol.

11. A composition of matter comprising a cellulose ether, trichloro tertiary butyl alcohol and acetone.

12. A composition of matter comprising ethyl cellulose, trichloro tertiary butyl alcohol and acetone.

In testimony whereof I have hereunto subscribed by name.

HENRY DREYFUS.